(12) United States Patent
Ricketts et al.

(10) Patent No.: US 9,635,811 B2
(45) Date of Patent: May 2, 2017

(54) ADJUSTABLE GATHERING CHAIN ASSEMBLY FOR A HEADER OF AN AGRICULTURAL HARVESTER

(71) Applicant: CNH Industrial America LLC, New Holland, PA (US)

(72) Inventors: Jonathan Eugene Ricketts, Coal Valley, IL (US); Bart M A Missotten, Herent (BE); Frederik Tallir, Esen (BE); Dré Waltherus Joachim Jongmans, Klundert (NL); Eric L. Walker, Leola, PA (US)

(73) Assignee: CNH Industrial America LL, New Holland, PA (US)

( * ) Notice: Subject to any disclaimer, the term of this patent is extended or adjusted under 35 U.S.C. 154(b) by 72 days.

(21) Appl. No.: 14/272,677

(22) Filed: May 8, 2014

(65) Prior Publication Data

US 2015/0319925 A1 Nov. 12, 2015

(51) Int. Cl.
*B65G 23/44* (2006.01)
*A01D 45/02* (2006.01)

(52) U.S. Cl.
CPC ......... *A01D 45/023* (2013.01); *A01D 45/021* (2013.01)

(58) Field of Classification Search
CPC ..... G01L 1/00; G01L 5/0061; G01N 33/0098; G01N 33/24; G01G 19/12; B65G 23/00; A01D 43/082; A01D 43/083; A01D 45/023
USPC .......... 73/865; 56/98; 198/814, 810.04, 813
See application file for complete search history.

(56) References Cited

U.S. PATENT DOCUMENTS

| 2,346,306 | A |   | 4/1944 | Hyman et al. |
|---|---|---|---|---|
| 2,647,353 | A |   | 8/1953 | Dort |
| 3,499,272 | A |   | 3/1970 | Looker |
| 3,646,737 | A | * | 3/1972 | Grant ................... A01D 45/021 56/106 |
| 3,759,021 | A | * | 9/1973 | Schreiner ............... A01D 69/06 56/106 |
| 3,940,913 | A | * | 3/1976 | Wallenfang .......... A01D 43/082 56/119 |
| 4,086,749 | A |   | 5/1978 | Greiner et al. |
| 4,199,924 | A |   | 4/1980 | Eistert et al. |
| 4,335,565 | A | * | 6/1982 | Knepper ................. A01F 12/16 460/105 |
| 4,397,134 | A |   | 8/1983 | Lausch et al. |
| 4,531,351 | A |   | 7/1985 | Sousek |

(Continued)

FOREIGN PATENT DOCUMENTS

| CN | 2394418 Y | 9/2000 |
|---|---|---|
| CN | 2798541 Y | 7/2006 |

(Continued)

*Primary Examiner* — Árpád Fábián-Kovács
(74) *Attorney, Agent, or Firm* — Patrick M. Sheldrake

(57) ABSTRACT

An adjustable gathering chain assembly includes a drive unit, a driven unit spaced from and movable with respect to the drive unit and an endless gathering chain extending between the drive unit and the driven unit. An adjustment unit including an idler member in engagement with the gathering chain is operable to move the idler member with respect to the drive unit in order to move the driven unit between first and second positions relative to the drive unit whereby the header may effectively harvest both standing crop and downed or lodged crop depending on harvesting conditions.

4 Claims, 11 Drawing Sheets

(56) References Cited

U.S. PATENT DOCUMENTS

| | | | |
|---|---|---|---|
| 4,539,799 A * | 9/1985 | Kalverkamp | A01D 45/021 56/106 |
| 4,566,256 A | 1/1986 | Sousek | |
| 4,584,825 A * | 4/1986 | Atkinson | A01D 45/021 56/119 |
| 4,621,968 A | 11/1986 | Hutchison | |
| 4,999,983 A * | 3/1991 | Britt | A01D 45/021 56/107 |
| 5,117,618 A | 6/1992 | Bich | |
| 5,148,659 A * | 9/1992 | Bich | A01D 43/082 56/102 |
| 5,150,564 A | 9/1992 | Bich et al. | |
| 5,878,561 A * | 3/1999 | Gunn | A01D 45/023 56/119 |
| 5,918,729 A * | 7/1999 | Chang | B65G 23/44 198/644 |
| 6,381,937 B1 * | 5/2002 | Nelson | A01D 57/22 56/127 |
| 6,625,969 B2 | 9/2003 | Glazik | |
| 7,073,316 B2 | 7/2006 | Resing et al. | |
| 8,191,703 B2 * | 6/2012 | Tokhtuev | B65G 43/02 198/810.04 |
| 8,224,534 B2 * | 7/2012 | Kowalchuk | A01D 45/021 460/29 |
| 8,267,240 B2 | 9/2012 | Moreland et al. | |
| 2008/0092507 A1 * | 4/2008 | Bollig | A01D 45/021 56/106 |
| 2010/0071337 A1 * | 3/2010 | Christensen | A01D 45/021 56/105 |
| 2011/0011048 A1 * | 1/2011 | Hoffman | A01D 45/023 56/119 |
| 2011/0079491 A1 * | 4/2011 | Tokhtuev | B65G 43/02 198/502.1 |
| 2012/0196710 A1 * | 8/2012 | Lehman | A01D 45/023 474/117 |
| 2013/0283749 A1 | 10/2013 | Adamczyk et al. | |
| 2014/0150394 A1 * | 6/2014 | Calmer | A01D 45/023 56/106 |
| 2014/0230392 A1 * | 8/2014 | Dybro | A01D 45/021 56/10.2 R |
| 2014/0230580 A1 * | 8/2014 | Dybro | A01D 45/021 73/865 |
| 2014/0236381 A1 * | 8/2014 | Anderson | A01D 75/00 701/1 |

FOREIGN PATENT DOCUMENTS

| | | |
|---|---|---|
| CN | 202172611 U | 3/2012 |
| DE | 102004061112 A1 | 6/2006 |

* cited by examiner

ADJUSTABLE GATHERING CHAIN ASSEMBLY FOR A HEADER OF AN AGRICULTURAL HARVESTER

BACKGROUND

The subject application relates generally to a header for use with agricultural harvesters. In particular, the subject application relates to an adjustable gathering chain assembly for an agricultural harvester header operable to harvest crops, such as corn.

The header of an agricultural harvester or combine is provided with row dividers and associated hoods for directing rows of corn stalks to downstream separation devices known as row units. The row units include stalk receiving slots and stripping plates, snapping rolls, and opposed rearwardly moving gathering chains. Thus, e.g., following separation of ears from stalks by the snapping rolls and stripping plates (also known as stalk rolls and deck plates, respectively), the separated ears are delivered by the gathering chains to an auger or other conveyor which conveys the harvested ears to a feederhouse of the combine. Harvested ears are then passed to the combine's inner chambers for downstream processing.

Row units are typically constructed with forwardly projecting members that support several components of the row unit including the deck plates, the stalk rolls, the gathering chains, the rear gathering chain sprockets (drive sprockets), the front gathering chain sprockets (driven sprockets), the hoods and the row dividers. Typical gathering chain assemblies include those in which the driven sprockets are located in a forwardly extended position relative to the leading edge of the deck plates and those where the driven sprockets are disposed in a somewhat retracted position relative to the leading edge of the deck plates. i.e., closer to the combine. Experience has shown that when the driven sprockets are situated in a prominently forward position relative to the deck plates, the header is better suited to gathering and lifting stalks of down or lodged crop. However, when the driven sprockets are situated in a forwardly projecting position, dry stalks tend to be knocked off by the gathering chain paddles before being engaged by the stalk rolls. Furthermore, when the driven sprockets are disposed in a relatively forwardly projecting position, the row units tend to pick up rocks and other debris which can cause clogging or even damage to the header. Conversely, when the driven sprockets are more rearwardly disposed relative to the deck plates, the row units are better suited to gathering crop that is more upright or standing because they knock off fewer standing stalks before they are pulled through the stalk rolls. However, no single location of the driven sprockets has been shown to be effective in harvesting under all crop conditions.

Accordingly, there is still a need for a row unit gathering chain assembly that addresses the foregoing issues associated with conventional headers. Such needs are satisfied by the subject application.

BRIEF SUMMARY

In accordance with a first aspect, the subject application provides an adjustable gathering chain assembly for a row unit of a header for an agricultural harvester. The gathering chain assembly includes a drive unit, a driven unit and an endless chain extending between the drive unit and the driven unit. The assembly further includes an adjustment unit for moving the endless chain between first and second positions, as well as a tensioner biasing one of the drive unit and the driven unit for tensioning the endless chain in the first and second positions.

In accordance with a second aspect, the subject application provides an adjustable gathering chain assembly for a row unit of a header for an agricultural harvester. The gathering chain assembly includes a drive sprocket, a driven sprocket spaced from and movable relative to the drive sprocket and a gathering chain entrained about the drive sprocket and the driven sprocket whereby rotation of the drive sprocket causes rotation of the driven sprocket. The assembly further includes an idler sprocket engaged with the gathering chain and an actuator operatively connected to the idler sprocket and operable to move the idler sprocket between first and second positions.

In accordance with a third aspect, the subject application provides an adjustable gathering chain assembly for a row unit of a header for an agricultural harvester. The gathering chain assembly includes a drive sprocket, a driven sprocket assembly spaced from and movable relative to the drive sprocket. The driven sprocket assembly includes first and second sprockets carried about opposite ends of an arm pivotably connected to a frame of the gathering chain assembly. A gathering chain is entrained about the drive sprocket and the driven sprocket assembly wherein the driven sprocket assembly pivots between a medial position and a lateral position.

In accordance with a fourth aspect, the subject application provides a header for an agricultural harvester. The header includes a plurality of row units each including deck plates defining a crop receiving gap therebetween. A drive sprocket and a driven sprocket are rotatably carried by the row unit and the driven sprocket is spaced from and movable relative to the drive sprocket. A gathering chain extends between the drive sprocket and the driven sprocket and an adjustment unit engages the gathering chain. An adjustment mechanism is operatively connected to the adjustment units and operable to move the adjustment units toward and away from the drive sprockets to adjust a distance between the drive sprockets and the driven sprockets. A linkage assembly includes a plurality of linkages connecting the adjustment units and the adjustment mechanism wherein movement of the adjustment mechanism between first and second positions moves the adjustment units between a first position wherein the driven sprockets are at a first distance from the drive unit and a second position wherein the driven sprockets are at a second distance from the drive sprockets.

In accordance with a fifth aspect, the subject application provides a header for an agricultural harvester. The header includes a row unit including an extendable gathering chain assembly having a drive unit, a driven unit, an endless chain extending between the drive unit and the driven unit, and an adjustment unit configured to move the endless chain. The header further includes a sensor for detecting changes in harvesting conditions about a forward end of the row unit and a feedback control mechanism operatively connected to the sensor and the adjustment unit for causing the adjustment unit to move the endless chain responsive to changes in harvesting conditions detected by the sensor.

In accordance with a sixth aspect, the subject application provides a method for adjusting a position of a gathering chain assembly for a row unit of a header for an agricultural harvester, in particular the distance between a drive sprocket and a driven sprocket of the gathering chain assembly. A gathering chain is entrained about the drive sprocket and the driven sprocket such that rotation of the drive sprocket causes rotation of the driven sprocket, and the driven sprocket is spaced from and movable relative to the drive sprocket. The method includes the acts of sensing a first harvesting condition about a forward end of the row unit, moving the gathering chain to a first position upon sensing the first harvesting condition such that the drive sprocket and driven sprocket are spaced apart at a first distance, sensing a second harvesting condition about the forward end of the row unit, and moving the gathering chain to a second position upon sensing the second harvesting condition such that the drive sprocket and driven sprocket are spaced apart at a second distance.

In accordance with a seventh aspect, the subject application provides a method for adjusting a position of a gathering chain assembly for a row unit of a header for an agricultural harvester, in particular the relative positions between a driven sprocket and a drive sprocket of the gathering chain assembly. A gathering chain is entrained about the drive sprocket and the driven sprocket such that rotation of the drive sprocket causes rotation of the driven sprocket, and the driven sprocket is spaced from and movable relative to the drive sprocket. The method includes the acts of sensing a first harvesting condition about a forward end of the row unit, moving the gathering chain to a first position upon sensing the first harvesting condition such that the driven sprocket is at a first position relative to the drive sprocket, sensing a second harvesting condition about the forward end of the row unit, and moving the gathering chain to a second position upon sensing the second harvesting condition such that the driven sprocket is at a second position relative to the drive sprocket.

In accordance with an eighth aspect, the subject application provides a selectively adjustable gathering chain assembly for a row unit of a header for an agricultural harvester. The gathering chain assembly enables the distance between the drive sprocket and the driven sprocket to be selectively adjusted by moving the driven sprocket forwardly and rearwardly whereby the header may effectively harvest both standing crop and down or lodged crop. The assembly thus provides the ability to move the leading edge of the gathering chain forward and rearward as needed under varying crop conditions. A mechanical, electrical or hydraulic device may be used to move an idler sprocket against the gathering chain in such a way as to extend or retract the driven sprocket relative to the drive sprocket. A fully mechanical adjustment device requires the operator to adjust the idler sprockets by hand or with a tool, whereas electrical or hydraulic devices may be operated and controlled from the cab of the harvester, either manually or automatically. Adjustment of the length of the gathering chain is required for a field or a portion thereof under which harvesting conditions change during the harvesting process.

It is also contemplated that the row units of a header may be adjusted in sections with certain sections being suited for harvesting down/lodged crop and other sections being suited for harvesting standing crop. For example, a 12-row header may be operable to adjust the right six rows different than the left six rows. Likewise, narrower or wider headers may be similarly adjusted in sections to achieve simultaneous harvesting of both down/lodged and standing crop. In any event, with a gathering chain assembly constructed in accordance with the subject application, the distance that the gathering chain is disposed fore and aft relative to the leading edge of the row unit deck plate is adjustable. Therefore, crop yield is increased notwithstanding changing harvesting conditions.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
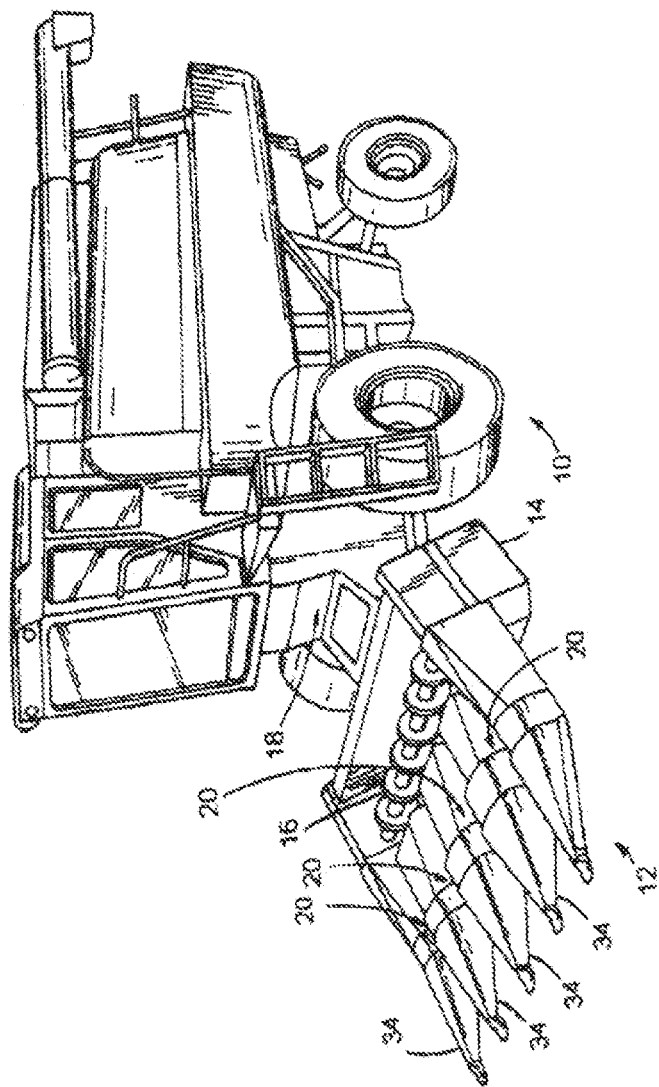
FIG. 1 is a perspective view of an agricultural combine including a conventional corn header assembly.

Referring now to the drawings, wherein aspects of the subject application are shown, FIG. 1 illustrates an agricultural harvester such as a combine 10 including a corn header assembly or corn header 12. The corn header 12 is shown to be operatively connected to the agricultural harvester 10 for harvesting e.g., corn and feeding the corn to a feederhouse for further downstream processing such as receiving crop residue, cutting, chopping and propelling the residue rearwardly and outwardly from the agricultural harvester 10 while retaining the valuable corn ears and kernels. Such feederhouses and harvesting operations are known in the art and a further detailed description of their structure, function and operation is not necessary for a complete understanding of the subject application. Alternatively, the corn header 12 can be connected to any device that may have use for a corn header.

Figure 2:
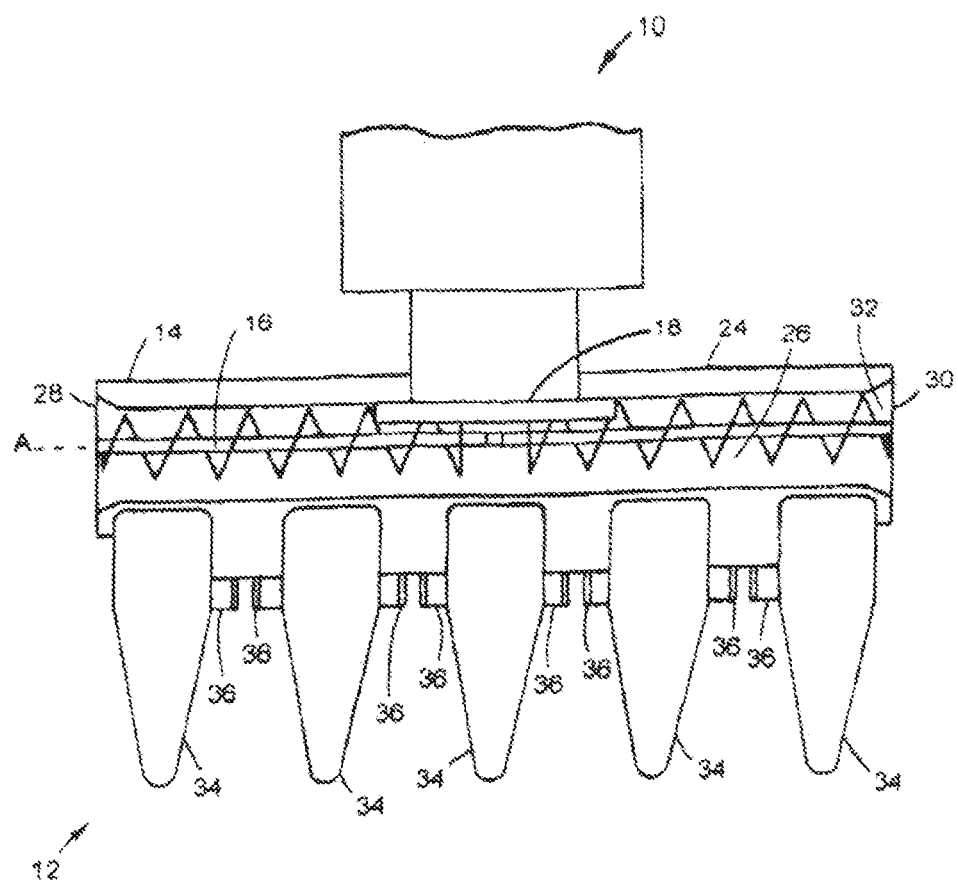
FIG. 2 is a top plan view of the corn header assembly of FIG. 1.

Referring to FIGS. 1 and 2, the corn header 12 includes a frame 14 for mounting to a forward end of the agricultural harvester 10, a conveyor 16 (such as an auger) extending lengthwise across the frame 14 for conveying crop material to a combine feeding location or feederhouse 18, and a plurality of row units 20 extending forwardly from the frame 14. The frame 14 is preferably configured as a substantially rectangular frame, as shown. However, the frame 14 can be configured as any shape suitable for the foregoing intended use. As seen in FIG. 2, the frame 14 includes a rear wall 24, a bottom wall 26 and a pair of side walls 28, 30. The frame 14 further includes a channel 32 formed partially by the bottom wall 26. The conveyor 16 conveys harvested corn along the channel 32 to the combine feeding location 18 located adjacent a midpoint of the channel 32.

The conveyor 16 can be a screw auger conveyor, but can alternatively be any conveyor capable of moving grain through the channel 32, such as a paddle system, a conveyor belt, a pressure based system, or any combination thereof. Such conveyors are known in the art and a further detailed description of their structure, function and operation is not necessary for a complete understanding of the subject application. However, typical augers applicable to the subject application are disclosed in U.S. Pat. Nos. 8,267,240 and 4,621,968, the entire disclosures of which are incorporated by reference herein.

The auger 16 is connected to the frame 14 at the side walls 28, 30 and rotates about axis A. The half of the auger 16 that is closest to side wall 28 moves the harvested crop towards the opposite side wall 30 and the half of the auger 16 that is closest to side wall 30 moves the harvested crop towards the opposite side wall 28. The auger 16 is positioned in front or above the combine feeding location 18 and, as the auger 16 rotates, harvested grain moves towards the center of the auger 16 for feeding the harvested grain into the combine feeding location 18.

Figure 3:
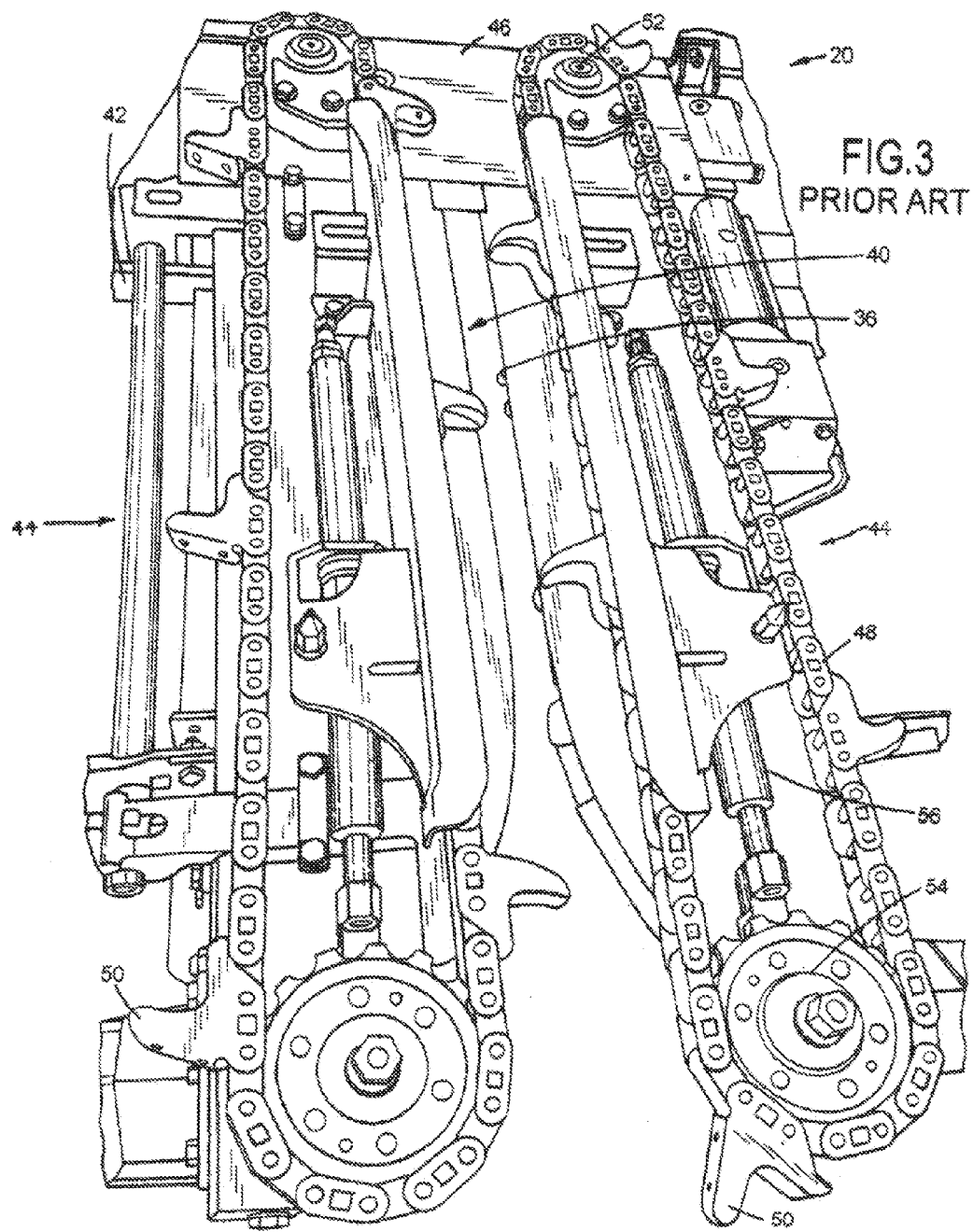
FIG. 3 is an enlarged partial perspective view of a row unit of the header assembly of FIG. 1.

Referring still to FIGS. 1 and 2, the corn header 10 further includes a plurality of row dividers 34. The row dividers 34 extend forwardly from the frame 14 and are connected to extend across a pair of adjacent row units 20 (FIG. 1). Such dividers 34 are known in the art and a further detailed description of their structure, function and operation is not necessary for a complete understanding of the subject application. However, typical dividers applicable to the subject application are disclosed in U.S. Pat. Nos. 6,625,969 and 7,073,316, the entire disclosures of which are incorporated by reference herein. The dividers 34 extend forwardly from the frame 14 and are connected to the plurality of row units 20 for directing a row of corn stalks towards stripping plates 36 (also commonly known as a deck plates) of the row units. During harvesting operations, the row dividers 34 direct a row of corn stalk towards deck plates 36 and unillustrated stalk rolls situated beneath the deck plates and between adjacent row dividers. As shown in FIG. 3, the deck plates 36 define a slot or gap 40 for receiving corn stalks and, as is known, stalk rolls pull the stalk downwardly snapping the corn ear when it strikes the deck plates 36. The stalk rolls desirably pull most of the crop residue down and out of the header.

Referring to FIG. 3, each row unit 20 includes a row unit frame 42 having a pair of row unit arms 44 connected by a chassis of the header. Mounted lengthwise on each row unit arm 44 is an endless gathering chain 48 having lugs 50 that direct corn stalks to the rear of the row unit 20 for the removal of corn ears from the stalks by the deck plates 36. In operation, crop material is stripped from the stalk and then travels across a breast plate 46 to the channel 32. The crop material stripped from the stalk is propelled rearwardly to the channel 32 due to the continuous flow of harvested crop material flowing rearwardly as a result of the actions of the gathering chains 48.

Each gathering chain 48 is entrained about a drive sprocket 52 disposed at a proximal end of a respective row unit arm 44 and a driven sprocket 54 located at a distal end of a respective row unit arm. As is known, drive sprocket 52 is rotated by unillustrated gearing operably connected to the drive train of the agricultural harvester and rotation of the drive sprocket 52 causes corresponding rotation of the driven sprocket 54. Biasing members 56 such as springs, extensible cylinders or the like are typically provided to exert forwardly directed force against the driven sprockets 54 in order to maintain tension in the gathering chains 48 during operation of the header.

A shortcoming of the arrangement shown in FIG. 3 is that the distance between the drive sprockets 52 and the driven sprockets 54 is not adjustable beyond the ordinary adjustments for maintaining tension on the gathering chain. As such, depending on whether the driven sprockets 54 are disposed relatively forwardly or relatively rearwardly with respect to the deck plates 36, the row unit 20 is situated to move effectively to gather crop which is either standing or down/lodged, but not both.

Figure 4:
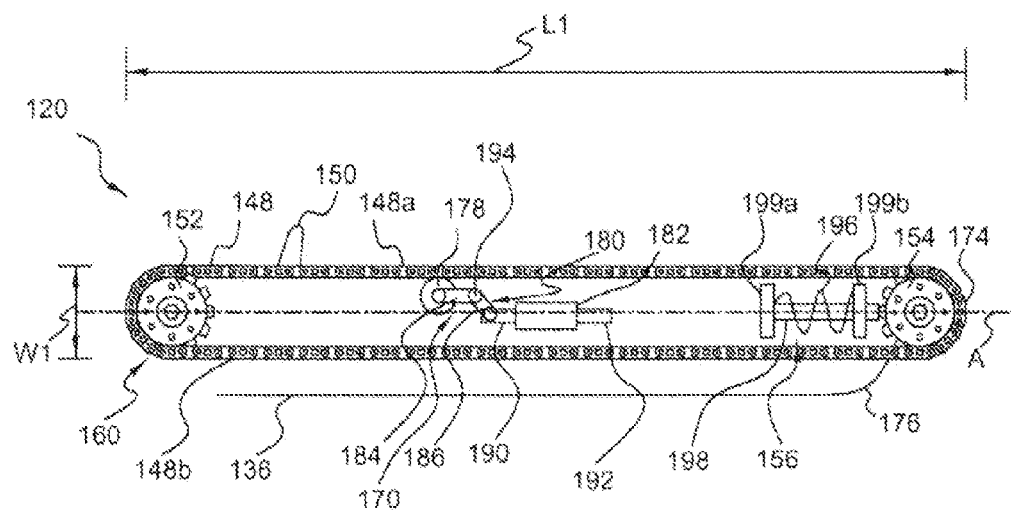
FIG. 4 is a schematic top plan view of an adjustable gathering chain assembly for a header of an agricultural harvester according to an aspect of the subject application with the assembly shown in an extended state.
Figure 5:
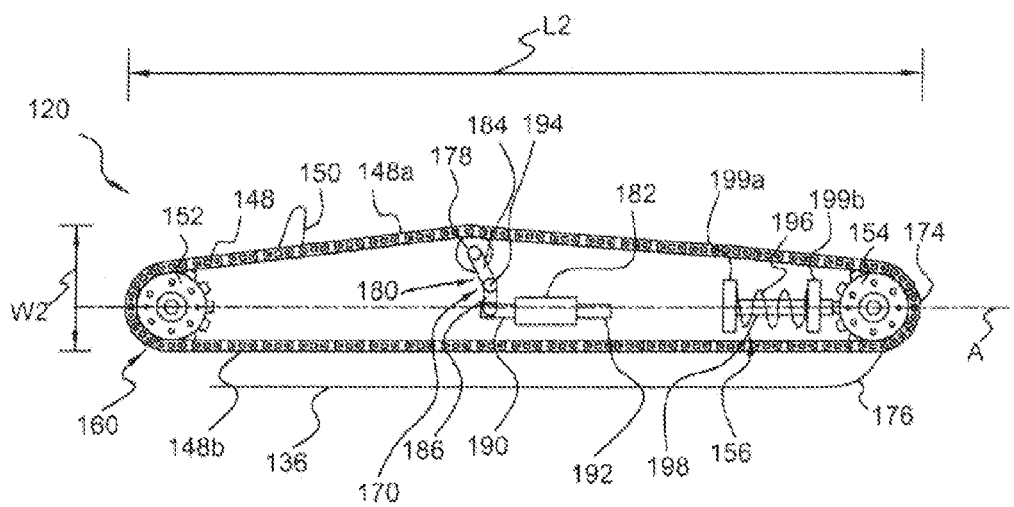
FIG. 5 is a schematic top plan view of the adjustable gathering chain assembly of FIG. 4 with the assembly shown in a retracted state.

Referring to FIGS. 4 and 5, there is shown an extendable gathering chain assembly 160 for a row unit 120 of a header for an agricultural harvester constructed in accordance with an aspect of the subject application. For clarity and simplicity of illustration, shown schematically in FIGS. 4 and 5 is a portion of one half of a row unit, in particular the extendable gathering chain assembly 160 and a deck plate 136. It will be understood, however, that a complete row unit will include, among other components, a pair of deck plates and a pair of gathering chain assemblies 160 situated in opposing relationship and defining a crop receiving slot or gap therebetween similar to slot 40 of FIG. 3.

Gathering chain assembly 160 includes a drive unit 152, a driven unit 154 and an endless chain 148 extending between the drive unit and the driven unit. Assembly 160 further includes an adjustment unit 170, further described below, for moving the endless chain between first and second positions and a tensioner 156, also described below, biasing one of the drive unit and the driven unit for tensioning the endless chain in the first and second positions and all positions therebetween and beyond.

The endless chain 148 is equipped with stalk-engaging lugs 150 (only one shown in FIG. 4 for purposes of clarity in illustration) and is driven by the drive unit. The drive unit 152 is configured as a drive sprocket and the driven unit 154 a driven sprocket. The driven sprocket 154 is spaced forwardly of the drive sprocket 152 and, as will be discussed hereinafter, the driven sprocket is movable in the fore and aft direction relative to the drive sprocket. The gathering chain 148 is entrained about the drive sprocket 152 and the driven sprocket 154, whereby rotation of the drive sprocket causes rotation of the driven sprocket. The drive unit or sprocket 152 is driven by unillustrated gearing operably connected to the drive train of the agricultural harvester. Such gearing is known in the art and a further detailed description of its structure, function and operation is not necessary for a complete understanding of the subject application.

As noted above, gathering chain assembly 160 includes an adjustment unit 170. The adjustment unit 170 is operable to move the endless chain 148 between first and second positions. In the first position the driven unit 154 is at a first distance L1 from the drive unit 152 (FIG. 4) and in the second position the driven unit is at a second distance L2 from the drive unit (FIG. 5). The first position corresponds to an extended position while the second position corresponds to a retracted position. In a first relatively extended position depicted in FIG. 4, a leading edge 174 of the gathering chain 148 projects significantly forwardly of the leading edge 176 of the deck plate 136 so that the gathering chain is better suited to harvesting downed or lodged crop. In a second relatively retracted position depicted in FIG. 5, the leading edge of the gathering chain is somewhat withdrawn relative to the leading edge of the deck plate such that the gathering chain is better suited to harvesting upright or standing crop. Alternatively expressed, the gathering chain assembly is movable relative to deck plate 136. It will be understood, however, that the first and second positions of the leading edge 174 of the gathering chain shown in FIGS. 4 and 5 are merely illustrative and not limitative of the positions that the leading edge of the gathering chain may assume during operation of an agricultural harvester that includes a header equipped with gathering chain assemblies 160.

In the first position shown in FIG. 4 the endless chain 148 has substantially parallel sides 148a and 148b. In the second position shown in FIG. 5 the endless chain has substantially non-parallel sides. That is, in the second position side 148a is extended or projected laterally outwardly whereas side 148b is straight. Moreover, in the first position (FIG. 4) the endless chain has a first length L1 and a first width W1 and in the second position (FIG. 5) the endless chain has a second length L2 smaller than the first length L1 and a second width W2 larger than the first width W1. Thus, the adjustment unit 170 is operable to move the endless chain between first and second positions, wherein in the first position the driven unit 154 is at a first distance from the drive unit 152 and in the second position the driven unit is at a second distance from the drive unit, the second distance being less than the first distance.

The adjustment unit 170 comprises an idler member 178, a stem 180 extending from the idler member and an extendable and retractable member 182. Idler member 178 can be an idler sprocket that engages the gathering chain 148. The stem 180 has a first end 184 proximal to the idler member and a second end 186 distal to the idler member. The second end is connected to a frame (not shown) of the gathering chain assembly via extendable and retractable member 182. Through stem 180, the extendable and retractable member 182 is operatively connected to the idler sprocket 178 and operable to move the idler sprocket in the medial and lateral directions of the gathering chain assembly toward and away from the drive sprocket 152 to adjust a distance between the drive sprocket and the driven sprocket 154. Similar to the driven sprocket 154, the idler sprocket 178 is rotated by movement of the gathering chain as a result of rotation of the drive sprocket 152. By virtue of extension and retraction of member 182, the adjustment unit 170 is adjustably positionable throughout a range of angles relative to a longitudinal axis A of the gathering chain assembly 160. The angle of the adjustment unit 170 relative to longitudinal axis A, or the lateral displacement of idler sprocket 178 relative to the drive sprocket 152, thus determines the distance between the drive sprocket 152 and the driven sprocket 154 or the amount of extension and retraction of the gathering chain assembly. As discussed in greater detail below, the angles that the adjustment unit 170 can be set by the combine operator or automatically established by a sensor and a feedback control mechanism e.g., controller arrangement responsive to the harvesting conditions associated with a particular field being harvested, e.g., whether crop is standing or down/lodged.

As depicted in FIGS. 4 and 5, the extendable and retractable member 182 can be an actuator such as a pressurized fluid cylinder, e.g., a hydraulic or pneumatic cylinder, or an electronic screw jack. A first end 190 of the actuator is operable to move the idler member 178 between first and second positions laterally toward and away from the drive sprocket 152 and a second end 192 of the actuator is connected to the frame of the gathering chain assembly. According to an aspect, the stem 180 can be a crank arm having a first end 184 pivotably connected to idler member 178 and a second end 186 pivotably connected to the first end 190 of the actuator 182. Between its first and second ends 184, 186 the stem 180 can be pivotably connected to the frame at pivot 194.

The gathering chain assembly 160 further includes a tensioner 156 operatively connected to the driven sprocket 154 for exerting a tensioning force against the endless gathering chain 148 in the first and second positions and all positions therebetween and beyond. By way of example and not limitation, tensioner 156 can bias the driven sprocket 154 to impart tension to the gathering chain 148 independent of the position of the driven sprocket relative to the drive sprocket. For example, tensioner 156 can include a compression spring 196 surrounding a threaded rod 198. The threaded rod can be anchored to the frame while the spring can be disposed between a nut 199a and a movable support 199b for the driven sprocket 154. With the tensioner 156 so constructed, turning of nut 199a in one direction compresses the spring 196 thereby increasing the force exerted by the tensioner on the chain 148 and turning of the nut in the opposite direction permits the spring to expand thereby decreasing the force exerted by the tensioner on the chain. It will be understood that tensioner 156 may assume other forms such as a pressurized fluid cylinder or a combination of such cylinder with the above-described spring and rod assembly.

Figure 6:
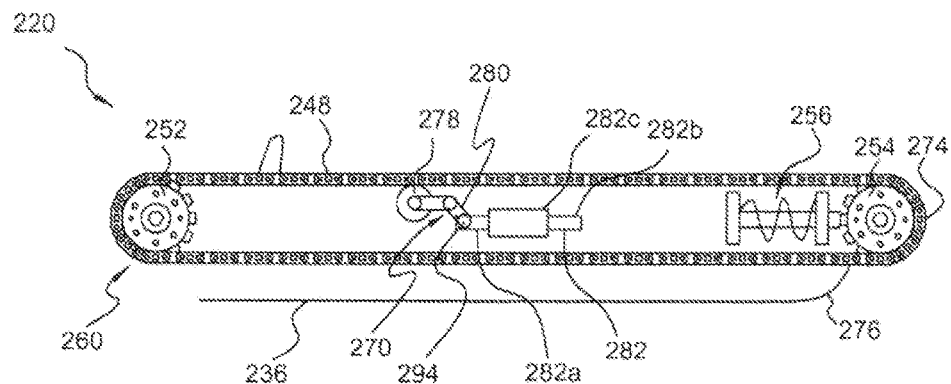
FIG. 6 is a schematic top plan view of an adjustable gathering chain assembly for a header of an agricultural harvester according to another aspect of the subject application with the assembly shown in an extended state.
Figure 7:
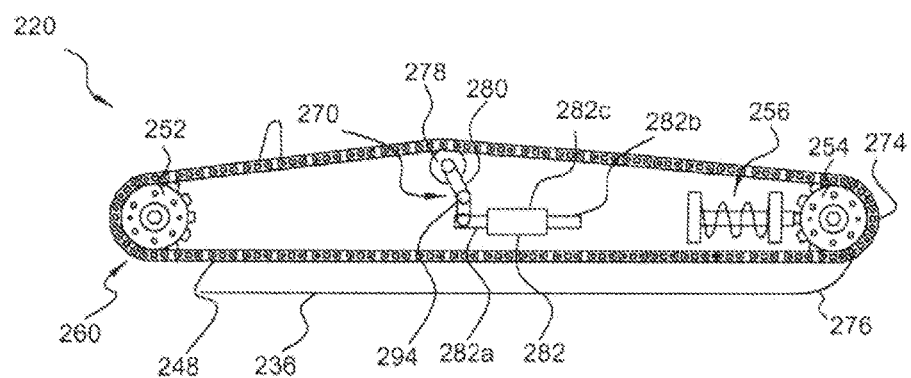
FIG. 7 is a schematic top plan view of the adjustable gathering chain assembly of FIG. 6 with the assembly shown in a retracted state.

Referring to FIGS. 6 and 7, there is illustrated a further aspect of the subject application, in particular, a gathering chain assembly 260 of row unit 220 shown in a first extended position (FIG. 6) and a second retracted position (FIG. 7) relative to a deck plate 236. Gathering chain assembly 260 is in many respects similar to gathering chain assembly 160 described above. Accordingly, only those features which depart materially in structure and/or function from their counterparts depicted in FIGS. 4 and 5 or are otherwise necessary for a complete understanding of the subject application will be described in detail.

Assembly 260 includes a drive unit or drive sprocket 252, a driven unit or driven sprocket 254, an endless gathering chain 248 extending between the drive and driven sprockets and an adjustment unit 270. According to an aspect, the adjustment unit 270 comprises an idler member 278, a stem 280 extending from the idler member and an extendable and retractable member 282. Idler member 278, stem 280 and extendable and retractable member 282 are constructed, arranged and function in substantially similar fashion to idler member 178, stem 180 and extendable and retractable member 182 of FIGS. 4 and 5. However, extendable and retractable member 282 can be a manually adjustable member such as a turnbuckle or the like that can be adjusted by hand or a suitable tool, e.g., a wrench. Alternatively, it can be adjusted via a hydraulic or electric motor configuration.

When the extendable and retractable member 282 is constructed as a turnbuckle, the turnbuckle 282 includes first and second oppositely threaded shafts 282*a*, 282*b* which are joined by an internally threaded shaft connector 282*c*. Shaft 282*b* can be affixed to the gathering chain assembly frame (not shown) and shaft 282*a* can be connected to stem 280 and movable relative to shaft 282*b*. Whether turned by hand, a tool or a reversible motor, the shaft connector 282*c* may be rotated in order to extend or retract shaft 282*a* relative to shaft 282*b*. That is, rotation of shaft connector 282*c* in one direction causes shaft 282*a* to move toward shaft 282*b* and rotation of the shaft connector in the opposite direction causes shaft 282*a* to move away from shaft 282*b*. As shaft 282*a* is drawn toward shaft 282*b* by rotation of shaft connector 282*c* in a first direction, stem 280 may rotate counterclockwise (as shown in FIGS. 6 and 7) about pivot 294 until the idler member 278 (which again can be an idler sprocket) assumes the position shown in FIG. 6. In this position, the opposite sides of endless chain 248 are substantially parallel and the driven unit or driven sprocket 254 and the leading edge 274 of the chain are fully extended with respect to the leading edge 276 of deck plate 236. Conversely, as shaft 282*a* is pushed away from shaft 282*b* by rotation of shaft connector 282*c* in a second direction opposite the first direction, stem 280 rotates clockwise (as shown in FIGS. 6 and 7) about pivot 294 until the idler member 278 assumes a position as shown in FIG. 7 whereby the opposite sides of endless chain 248 are not parallel. That is, the idler sprocket 278 is displaced laterally away from the drive sprocket 252 and/or the driven unit or driven sprocket 254 and the gathering chain assembly is retracted such that a leading edge 274 of chain 248 is correspondingly retracted in relation to a leading edge 276 of the deck plate 236.

Further, similar to gathering chain assembly 160, assembly 260 includes a tensioner 256 which can be constructed substantially similar to tensioner 156 to maintain tension in the endless chain 248 throughout the ranges of motion of the driven sprocket 254, turnbuckle 282, idler member 278 and stem 280.

Figure 8:
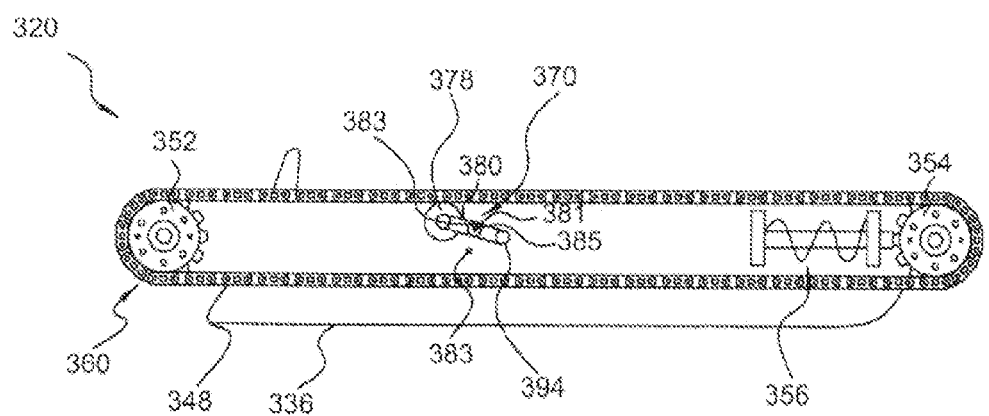
FIG. 8 is a schematic top plan view of an adjustable gathering chain assembly for a header of an agricultural harvester according to another aspect of the subject application with the assembly shown in an extended state.
Figure 9:
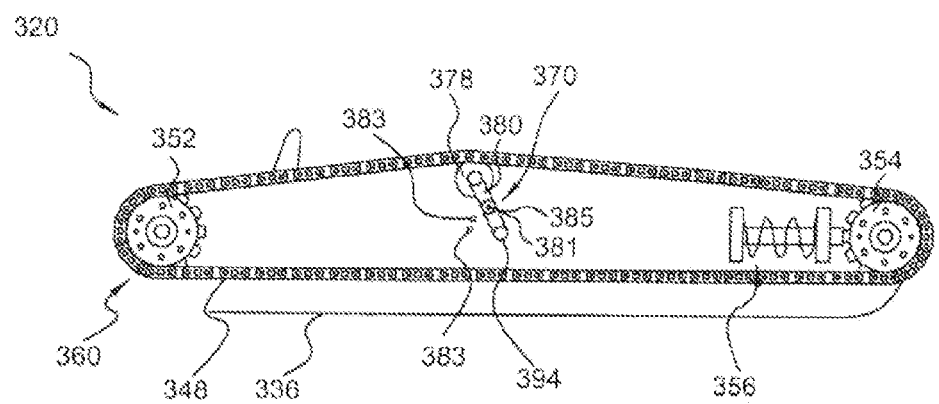
FIG. 9 is a schematic top plan view of the adjustable gathering chain assembly of FIG. 8 with the assembly shown in a retracted state.

Referring to FIGS. 8 and 9, there is illustrated a further aspect of the subject application, in particular, a portion of a row unit 320 including a gathering chain assembly 360 shown in an extended position (FIG. 8) and a retracted position (FIG. 9). Assembly 360 includes a drive unit or drive sprocket 352, a driven unit or driven sprocket 354, an endless gathering chain 348 extending between the drive and driven sprockets and an adjustment unit 370. As shown, the adjustment unit 370 comprises an idler member or sprocket 378 and a stem 380 extending from the idler member. Unlike the previously described adjustment units which include extendable and retractable actuators or turnbuckles, adjustment unit 370 includes a pivoting or swinging stem 380 having one end pivotably attached to the gathering chain assembly frame at pivot 394 and a second end connected to and rotatably supporting idler sprocket 378. Stem 380 is provided with an aperture 381 which is adapted for alignment with a plurality of apertures 383 provided in a gathering chain assembly frame. According to an aspect, the apertures 383 are spaced from one another and can be arranged in an arc. A removable retaining pin 385 is insertable into the stem aperture 381 and the gathering chain assembly frame apertures 383 for adjusting a position of the idler member 378 relative to the longitudinal axis A of the gathering chain assembly 360, as well as relative to the drive sprocket 352. That is, when it becomes necessary to adjust the length of the gathering chain 348 relative to a deck plate 336, a user removes the retaining pin 385, turns the stem 380 either clockwise or counterclockwise (as shown in FIGS. 8 and 9) and reinserts the retaining pin into the stem aperture 385 and an aligned one of the gathering chain assembly frame apertures 383 to thereby secure the stem and the idler sprocket in a desired angular position.

Further, similar to gathering chain assembly 160, assembly 360 includes a tensioner 356 which can be constructed substantially similar to tensioner 156 to maintain tension in the endless chain 348 throughout the ranges of motion of the driven sprocket 354, idler member 378 and stem 380.

Figure 10:
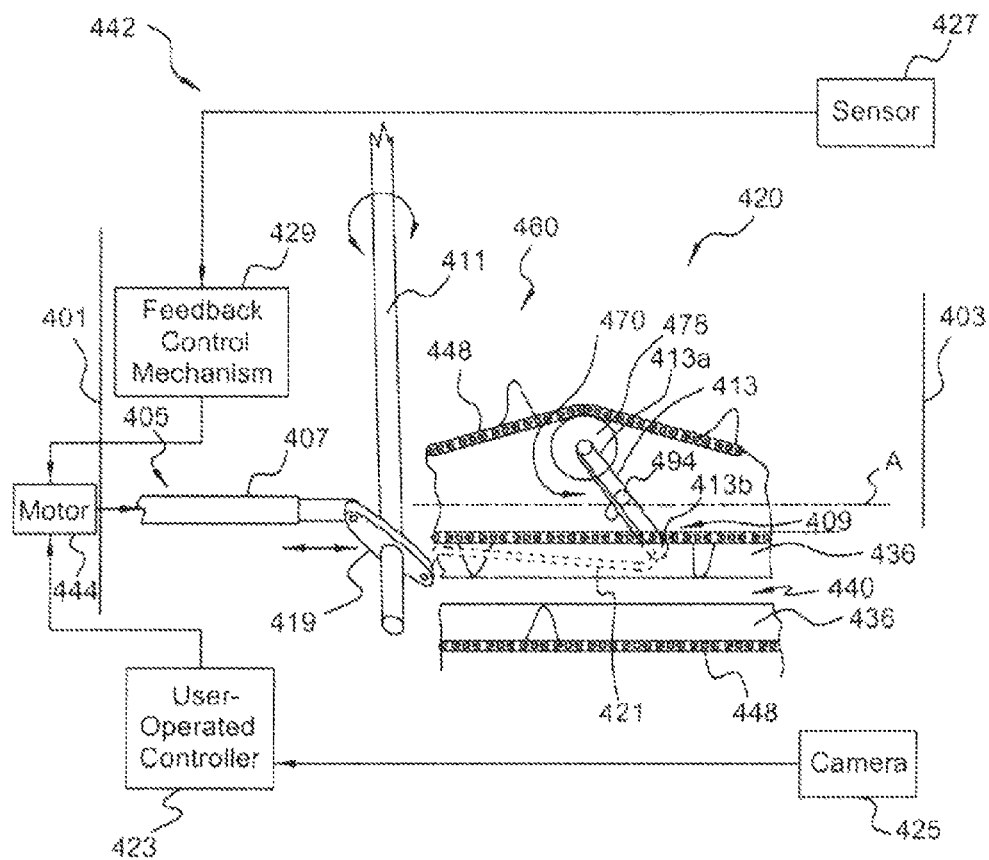
FIG. 10 is a schematic top perspective and partially cut view of a header assembly according to another aspect of the subject application with the assembly shown in a retracted state and with certain elements thereof omitted for clarity of illustration.

Referring to FIG. 10, there is illustrated a further aspect of the subject application, in particular, a portion of a header including a row unit 420 having a gathering chain assembly 460 disposed in a retracted position. Although only one row unit is partially shown in FIG. 10, it will be understood that a plurality of such row units are provided along the width of the header.

Row unit 420 includes a pair of spaced apart deck plates 436 that define a crop-receiving slot or gap 440 therebetween. As shown, each of the deck plates supports an endless gathering chain 448 similar in structure and function to gathering chains 148, 248 and 348 described above. While not illustrated in FIG. 10 for simplicity and clarity of illustration, row unit 420 includes a drive unit or drive sprocket situated generally toward the aft or rearward end 401 of the header and a driven unit or driven sprocket situated generally toward the fore or forward end 403 of the header. The driven sprocket is spaced from and movable relative to the drive sprocket in the manner discussed above in respect to FIGS. 4-9. Likewise, gathering chain 448 extends between and is entrained about the drive sprocket and the driven sprocket. Moreover, gathering chain assemblies 460 additionally include unillustrated tensioners similar in structure and function to the tensioners 156, 256 and 356 described above. It will be understood that such drive units, driven units and tensioners are constructed and function similar to their counterparts disclosed above in connection with FIGS. 4-9.

As seen in FIG. 10, an adjustment unit 470 is provided which engages the gathering chain 448 and includes an idler member or sprocket 478. An adjustment mechanism 405 comprising a manual, powered or automatically operated extendable and retractable member 407 which is operable to move idler sprocket 478 laterally with respect to a longitudinal axis A of the gathering chain assembly and/or the drive sprocket. That is, the adjustment mechanism 405 is operatively connected to the adjustment unit 470 and operable to move the adjustment unit laterally toward and away from the drive sprocket and the longitudinal axis A to adjust a distance between the drive and driven sprockets. The adjustment mechanism 405 can be a manual or powered actuator that exerts force upon an adjustment rod 411, described below, in order to provide desired adjustment of the length of gathering chain 448.

According to the aspect illustrated in FIG. 10, the header includes a linkage assembly 409 having a plurality of linkages. Each of the linkages connects the adjustment unit 470 and the adjustment mechanism 405. So constructed and arranged, movement of the adjustment mechanism 405 between first and second positions moves the adjustment unit 470 between a first position wherein the driven sprocket is at a first distance from the drive sprocket and a second position wherein the driven sprocket is at a second distance from the drive sprocket. For example, the linkage assembly 409 includes an adjustment rod 411 operatively connected to the adjustment mechanism 405 and each of the plurality of linkages. The adjustment rod 411 extends substantially the width of the header and carries a plurality of linkage assemblies 409. The plurality of linkages is arranged in a spaced apart relationship along the length of the adjustment rod.

According to an aspect, each of the plurality of linkages includes a first link 413 having first and second ends 413a and 413b, respectively, that is pivotably mounted to a chassis of the gathering chain assembly frame at pivot 494. The first end 413a of the first link 413 is connected to idler sprocket 478 of the adjustment unit 470. Each of the plurality of linkages also includes a second link 419 fixedly mounted to the adjustment rod 411 and a third link 421 connecting the second end 413b of the first link 413 with the second link 419. With the plurality of linkages so constructed and arranged, motive force exerted by the adjustment mechanism 405 causes movement of the second links 419 and the adjustment rod 411. Such rotational motion causes linear motion to be transferred from the second links 419 to the first links 413 through the third links 421. Consequently, the first links 413 rotate about pivots 494 and move the adjustment unit 470 toward and away from the drive sprockets.

While FIG. 10 shows a single adjustment mechanism 405 for operating a plurality of adjustment units 470 and linkage assemblies 409, it will be appreciated that more than one adjustment mechanism may be provided to achieve the same effect. By way of example but not limitation, the number of adjustment mechanisms 405 can correspond substantially in number to the number of adjustment units 470 and linkage assemblies 409.

According to the subject application, control of the adjustable gathering chain assembly can be realized in various ways. For instance, and as described above, adjustment of the distance between the driven sprocket and the drive sprocket can be achieved by moving the idler member or idler sprocket via activation of a powered actuator such as a hydraulic cylinder, pneumatic cylinder or a screw jack, or by operation of a manually adjustable mechanism such as a turnbuckle. In the case of a powered actuator, extension and retraction of the actuator can be achieved by conscious user action. More particularly, the header can be provided with a user-operated controller 423 (FIG. 10) via which the user or operator may selectively activate the adjustment mechanism, e.g., the extendable and retractable member 182 of FIGS. 4 and 5 or the member 407 (if hydraulically, pneumatically, electrically or otherwise powered) by operation of a motor 444. Motor 444 can be any suitable hydraulic, pneumatic or electric motor that is operable to respond to commands from controller 423. Controller 423 may be located externally of the cab of the combine harvester. However, for user convenience, controller 423 can be located within combine cab. In order to assist the user in controlling the actuator using controller 423, FIG. 10 indicates that the header may be provided with an optional video camera 425 located at, adjacent to or otherwise directed toward the forward end 403 of the row unit whereby the camera can provide visual images of the crop being harvested so that the operator can make real-time adjustment of the length of the gathering chain as harvesting conditions change.

Alternatively, the gathering chain assembly can be automatically controlled. For example, as seen in FIG. 10 the gathering chain assembly can be operatively connected to one or more sensors 427 which detect changes in harvesting conditions about the forward end 403 of the row unit 420. The sensor(s) 427 can be operatively connected to the actuator 407 via a controller or feedback control mechanism 429. Constructed as such, the actuator 407 activates in response to output from the sensor(s) upon detecting a change in harvesting conditions. That is, the sensor(s) 427 gather data reflective of harvesting conditions and provide output which is received as input by the feedback control mechanism 429. In turn, the feedback control mechanism, which is operatively connected to the sensor(s) 427 and the adjustment unit 405, issues commands to the adjustment unit for causing the adjustment unit to move the endless chain responsive to changes in harvesting conditions detected by the sensor(s). Consequently, the feedback control mechanism 429 causes the motor 444 to move the actuator 407 to extend or retract as may be appropriate to accommodate changing harvesting conditions in real time. That is, the adjustment unit moves the endless chain between first and second positions, wherein in the first position the driven unit is at a first distance from the drive unit and in the second position the driven unit is at a second distance from the drive unit, wherein the second distance is less than the first distance.

Changing harvesting conditions that may be detected by the sensor(s) 427 can include the disposition of the crop being harvested, e.g., standing or down/lodged. However, the sensor(s) 427 may also be used to detect changes in operating parameters of the combine, such as the pressure on cleaning system. For example, the cleaning system pressure can be monitored for increases or decreases since the pressure on the cleaning system is based at least partly on the material other than grain ("MOG") load on the system. Thus, in response to the detected pressure on the cleaning system, the gathering chain assembly can adjust to a position that takes in more or less material, e.g., a relatively forwardly extended or retracted position. Increased MOG intake also results in increased power burdens on the auger or rotor.

Thus, increased or decreased power requirements may also be another condition that may be detected by the sensor(s) 427.

It will be further understood that, notwithstanding the ability to utilize automatic control of the gathering chain assembly adjustment mechanism, the human combine operator can override automatic control via use of controller 423 if he or she believes that automatic control is not well-suited to harvesting under certain crop conditions.

Additionally, although shown and described in connection with the header row unit 420 of FIG. 10, it will be understood that the operator-controlled and automatically-controlled mechanisms 423 and 429 shown and described in connection with FIG. 10 may be used with any of the of the gathering chain assemblies disclosed hereinabove and below.

Figure 11:
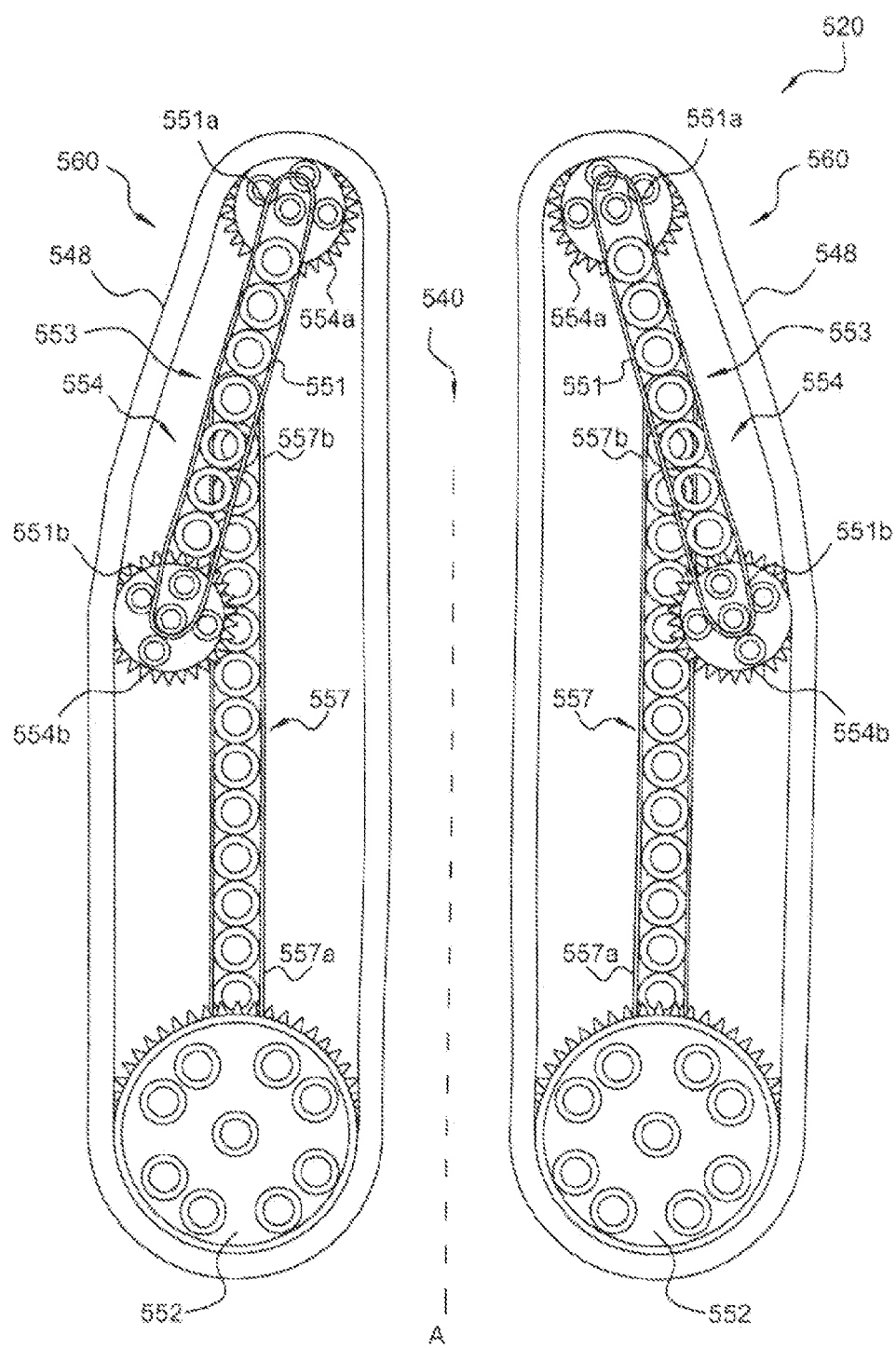
FIG. 11 is a schematic top plan view of an adjustable gathering chain assembly for a header of an agricultural harvester according to another aspect of the subject application with the assembly shown in a state suitable for harvesting down or lodged crop and with certain elements thereof omitted for clarity of illustration.
Figure 12:
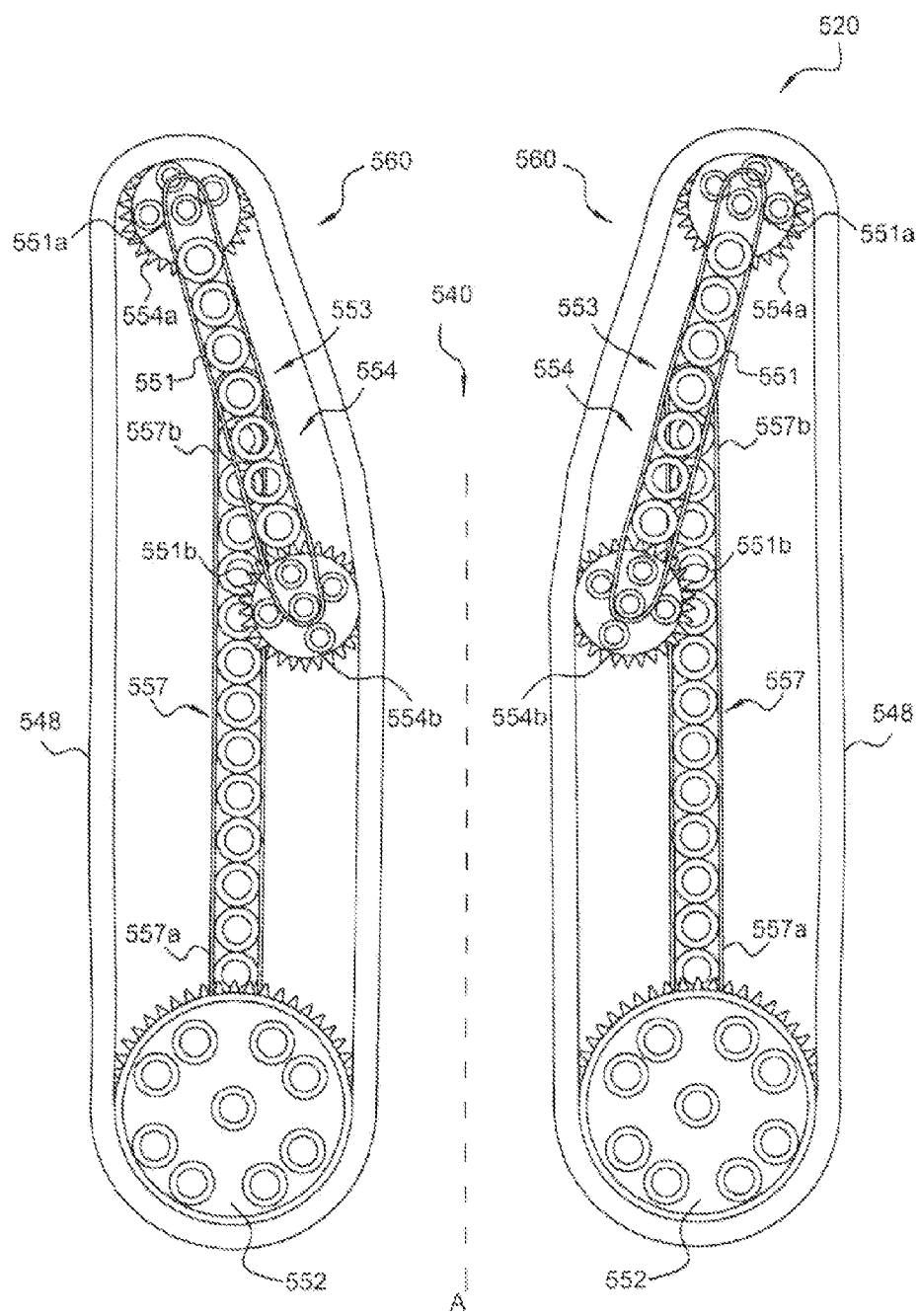
FIG. 12 is a schematic top plan view of the adjustable gathering chain assembly of FIG. 11 with the assembly shown in a state suitable for harvesting standing crop and with certain elements thereof omitted for clarity of illustration.

Referring to FIGS. 11 and 12, there is illustrated schematically a further aspect of the subject application, in particular, a row unit 520 (without deck plates shown) including opposed gathering chain assemblies 560 shown in a down or lodged crop gathering position (FIG. 11) and a standing crop gathering position (FIG. 12). Each gathering chain assembly 560 includes a drive unit or drive sprocket 552 and a driven unit assembly or driven sprocket assembly 554 spaced from and movable relative to the drive sprocket. An endless gathering chain 548 extends between and is entrained about the drive sprocket 552 and the driven sprocket assembly 554 whereby rotation of the drive sprocket causes rotation of the driven sprocket assembly. The gathering chains 548 are situated in opposing relationship and define a crop receiving slot or gap 540 therebetween. The driven sprocket assembly 554 includes first and second sprockets carried about opposite ends of an arm pivotably connected to a frame of the gathering chain assembly such that the driven sprocket assembly pivots between a medial position (FIG. 11) and a lateral position (FIG. 12). More specifically, each driven sprocket assembly 554 comprises a driven sprocket 554a and an idler sprocket 554b engaged with the gathering chain 548. The driven sprocket assembly further includes a pivot arm 551 having first and second ends 551a and 551b, respectively. The first end 551a of the pivot arm rotatably carries the driven sprocket 554a and the second end 551b of the pivot arm rotatably carries the idler sprocket 554b. As described below, movement of the idler sprocket 554b between first and second positions causes movement of the driven sprocket 554a between first and second positions relative to the drive sprocket 552. By way of example, in the first position the driven sprocket 554a is proximate the centerline A of the row unit 520 and in the second position the driven sprocket is distal to the centerline A of the row unit.

An elongated stationary arm 557 having first and second ends 557a and 557b, respectively, is connected at its first end 557a to an unillustrated gathering chain assembly frame. Additionally, the first end 557a rotatably carries the drive sprocket 552. The second end 557b of the stationary arm 557 is likewise connected to the gathering chain assembly frame and pivotably supports pivot arm 551 about a mid-region 553 thereof. So constructed and arranged, the pivot arm 551 is capable of pivoting or swinging in clockwise and counterclockwise directions (when viewed as shown in FIGS. 11 and 12) relative to the stationary arm 557. As such, the idler sprocket 554b can be brought into engagement with either the side of the gathering chain between the drive sprocket 552 and the driven sprocket 554a proximal the crop receiving slot 540 or the side of the gathering chain between the drive sprocket and the driven sprocket distal to the crop receiving slot. That is, the idler sprocket can be pivotably positioned to engage the gathering chain about its medial side or its lateral side. The driven sprocket 554a is thus pivoted about a fixed point on the gathering chain assembly to move the gathering chain 548 between a first position proximate the centerline A of the row unit and a second position distal to the centerline A of the row unit. The pivot point is chosen in a way that the tension on the chain is best maintained for the required range of motion of the driven sprocket.

Figure 13A:
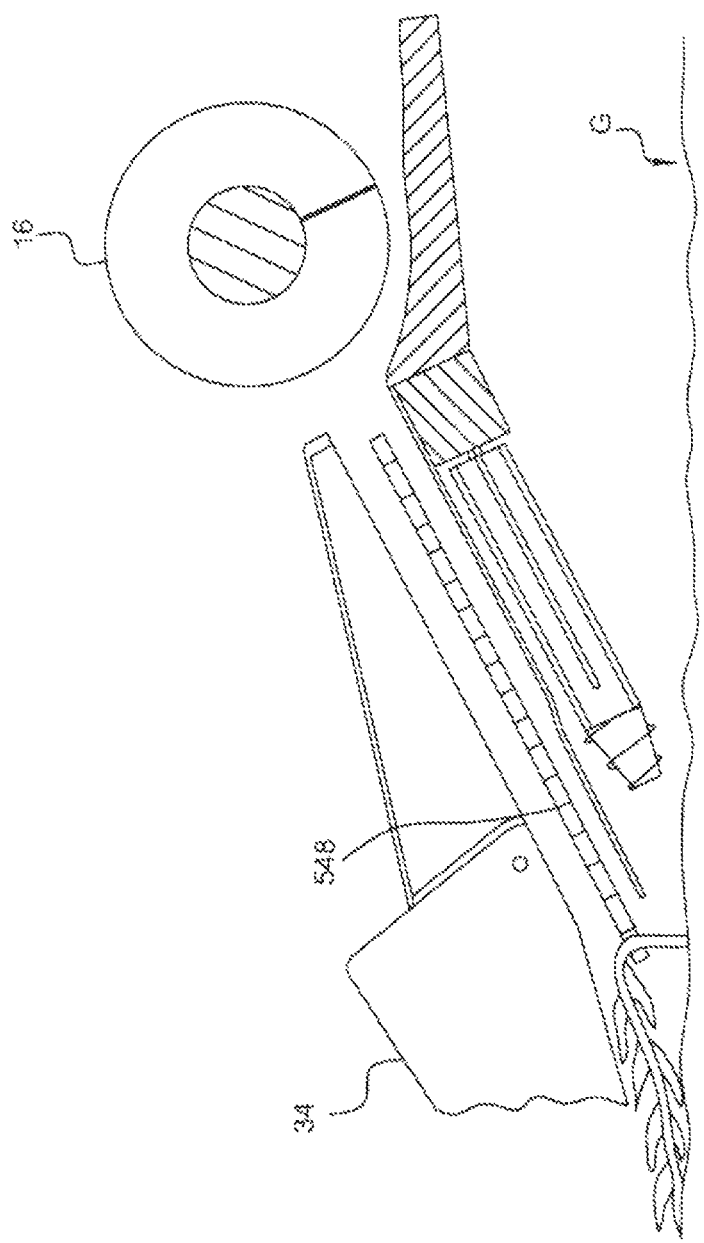
FIG. 13A is a side elevational section view of an agricultural harvester header according to the aspect of the subject application shown in FIG. 11 with the adjustable gathering chain assembly thereof shown in a state suitable for harvesting down or lodged crop.

So constructed and arranged, the driven sprocket 554a of each gathering chain assembly 560 can be placed into a first position (FIG. 11) wherein the entirety of the sides of the gathering chains on opposite sides of the crop receiving slot 540 extending between the drive and driven sprockets are straight and parallel. As shown in FIG. 13A, as the gathering chains are also angled downwardly and as the entire length of the gathering chains of the row unit define a narrow throat, the row unit is suited for harvesting down or lodged crop since the gathering chains pick up crop which is lower to the ground G. Additionally, the driven sprocket of each gathering chain assembly can be placed into a second position (FIG. 12) in which the driven sprocket 554a is moved laterally away from the crop receiving slot 540 or centerline A of the row unit such that only the aft portions of the sides of the gathering chains on opposite sides of the crop receiving slot are parallel. In this configuration the fore portions of the gathering chains define a wide throat region followed by a narrow throat region which is suited for harvesting standing crop since the narrow throat region is situated higher up from the ground G due to the downwardly angled configuration of the gathering chain assembly (see FIG. 13B).

Although not illustrated, it will be understood that any suitable mechanical, electromechanical, pneumatic, hydraulic or manual actuators can be employed to move the pivot arm 551 between first and second positions, e.g., in clockwise and counterclockwise directions when viewed as shown in FIGS. 11 and 12 in order to dispose the driven sprockets 554a into down/lodged or standing crop harvesting positions.

The subject application also provides methods for adjusting the position of a gathering chain assembly for a row unit of a header for an agricultural harvester to harvest both down/lodged crop and upright/standing crop. An exemplary but non-limitative method involves several acts. Initially, a first harvesting condition is sensed about a forward end of the row unit. Such sensing can be achieved either visually or by the aid of at least one sensor. Upon sensing the first harvesting condition, an endless gathering chain extending between the drive sprocket and the driven sprocket of a row unit is moved under manual or automatic control to a first position to establish a spaced apart first distance between the drive sprocket and the driven sprocket. Thereafter, a second harvesting condition is sensed about the forward end of the row unit, again either visually or via at least one sensor. Then, upon sensing the second harvesting condition, the gathering chain of the row unit is moved under manual or automatic control to a second position to establish a second spaced apart distance between the drive sprocket and the driven sprocket. The acts of moving the gathering chain between the first and second positions can include adjusting the position of an adjustment unit engaged with the gathering chain. The position of the adjusting unit can be adjusted by use of a manual, powered or automatically-controlled extendable and retractable member. Alternatively expressed, the side of the gathering chain opposite the row unit crop receiving slot can be laterally displaceable with respect to the drive sprocket. Hence, the gathering chain can be configured to have substantially parallel sides when the gathering chain is in a first or fully extended position (for example, when harvesting down/lodged crop or when sensor(s) detect relatively higher burden on the on the cleaning system or rotor) or substantially non-parallel sides when in a second or retracted position wherein the gathering chain is less than fully extended (for example, when harvesting standing/upright crop or when sensor(s) detect relatively lower burden on the on the cleaning system or rotor).

A further exemplary but non-limitative method of the subject application involves several acts. Initially, a first harvesting condition is sensed about a forward end of the row unit. Such sensing can be achieved either visually or by the aid of at least one sensor. Upon sensing the first harvesting condition, an endless gathering chain extending between the drive sprocket and the driven sprocket is moved under manual or automatic control to a first position to establish a first position of the driven sprocket relative to the drive sprocket. Thereafter, a second harvesting condition is sensed about the forward end of the row unit, again either visually or via at least one sensor. Finally, upon sensing the second harvesting condition, the gathering chain is moved under manual or automatic control to a second position to establish a second position of the driven sprocket relative to the drive sprocket. Thus, the driven sprocket is laterally displaceable with respect to the drive sprocket between the first and second positions. The acts of moving the gathering chain between the first and second positions can include adjusting the position of an adjustment unit engaged with the gathering chain. The position of the adjusting unit can be adjusted by use of a manual, powered or automatically-controlled extendable and retractable member.

Figure 13B:
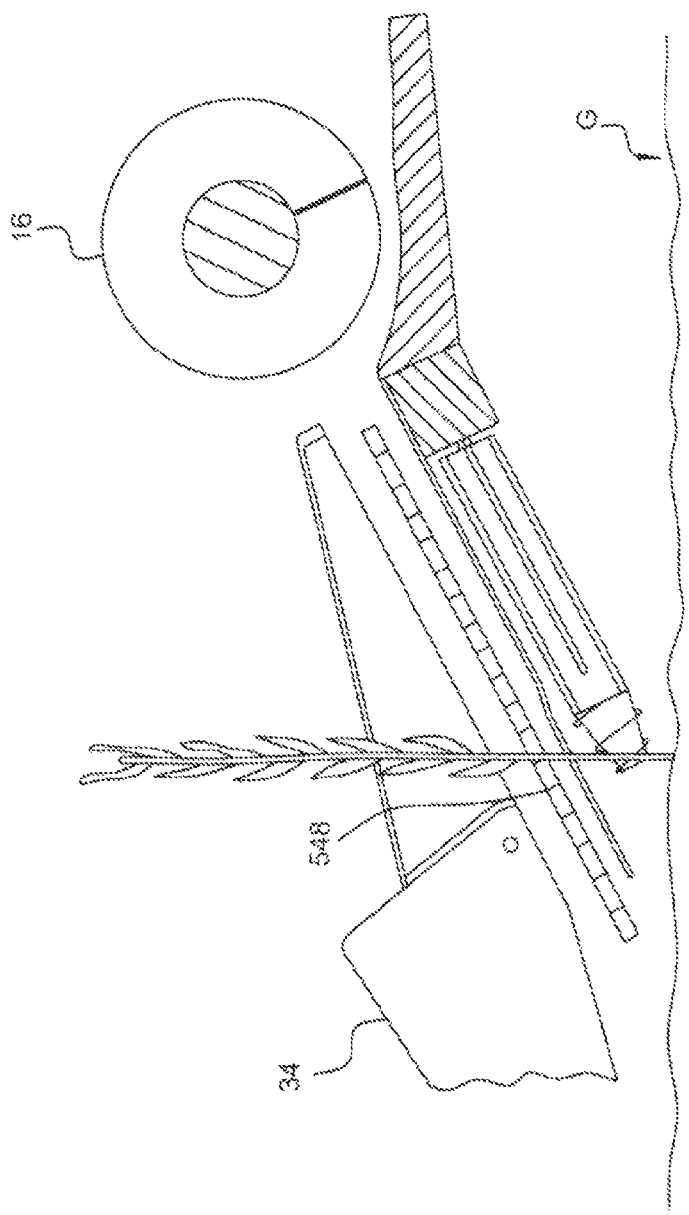
FIG. 13B is a side elevational section view of an agricultural harvester header according to the aspect of the subject application shown in FIG. 12 with the adjustable gathering chain assembly thereof shown in a state suitable for harvesting standing crop.

In another exemplary method of the subject application, the act of extending and retracting the point of contact between the gathering chain and crop involves the acts of pivoting a driven sprocket about a fixed point on the gathering chain assembly to move the gathering chain between a first position and a second position. By way of example but not limitation, in the first position the driven sprocket is disposed proximate a centerline of the row unit and in a second position the driven sprocket is disposed distal to the centerline of the row unit. Hence, the inner sides of the opposed gathering chains closest to the crop receiving slot are configured to be substantially parallel for the entire distance between the drive sprockets and the driven sprockets. In this configuration, the driven sprockets are in the first position to define a continuous narrow crop receiving throat (for example, when harvesting down/lodged crop or when sensor(s) detect relatively higher burden on the on the cleaning system or rotor) that is closer to the ground due to the sloped configuration of the row unit, as shown e.g., in FIG. 13A. In the alternative, the inner sides of the opposed gathering chains are configured to be at least partially non-parallel between the drive sprockets and the driven sprockets when the driven sprockets are in the second position to define a wide crop receiving throat portion followed by a narrow throat portion (for example, when harvesting standing/upright crop or when sensor(s) detect relatively lower burden on the on the cleaning system or rotor). In this configuration, the gathering chain engages crop into position higher up from the ground e.g., as shown in FIG. 13B. It will be understood, however, that the terms "first position" and "second position" as used in the example above are for illustrative purposes only. That is, the starting position of the driven sprocket relative to the drive sprocket may be opposite to that described above, in which case the "first position" may correspond to the "second position," and vice versa.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A header for an agricultural harvester comprising:
   a row unit that includes an extendable gathering chain assembly having:
   a drive unit,
   a driven unit,
   an endless chain extending between the drive unit and the driven unit, and
   an adjustment unit comprising an idler and an extendable and retractable portion and the idler positioned to contact the endless chain;
   a sensor for detecting changes in harvesting conditions about a forward end of the row unit; and
   a feedback control mechanism operatively connected to the sensor and the adjustment unit, the feedback control mechanism configured to adjust the position of the endless chain by controlling the adjustment unit to move the extendable and retractable portion and laterally move the idler with respect to the drive unit in response to changes in harvesting conditions detected by the sensor, wherein movement of the idler adjusts the distance between the drive unit and the driven unit.

2. The header of claim 1, wherein the adjustment unit moves the endless chain between first and second positions, wherein in the first position the driven unit is at a first distance from the drive unit and in the second position the driven unit is at a second distance from the drive unit, and wherein the second distance is less than the first distance.

3. A method for adjusting the position of a gathering chain assembly for a row unit of a header for an agricultural harvester, wherein a gathering chain is entrained about the drive sprocket and the driven sprocket such that rotation of the drive sprocket causes rotation of the driven sprocket, and wherein the driven sprocket is spaced from and movable relative to the drive sprocket, the method comprising:
   sensing a harvesting condition with at least one sensor, wherein a controller is connected to the sensor and an adjustment unit contacting the chain;
   wherein the harvesting condition is the presence of down/lodged crop or an increased burden on a rotor or the cleaning system;
   moving the gathering chain from a first position to a second position by controlling the adjustment unit with the controller, wherein the controller is programmed upon receiving a signal from the sensor representative of sensing the harvesting condition to control the adjustment unit to move the position of an idler of the adjustment unit that is engaged with the gathering chain such that the drive sprocket and driven sprocket are spaced apart at a first distance; wherein the distance between the drive sprocket and driven sprocket is greater in the first position than in the second position.

4. A method for adjusting the position of a gathering chain assembly for a row unit of a header for an agricultural harvester, wherein a gathering chain is entrained about the drive sprocket and the driven sprocket such that rotation of the drive sprocket causes rotation of the driven sprocket, and the driven sprocket is spaced from and movable relative to the drive sprocket, the method comprising:

sensing with a sensor a first harvesting condition about a forward end of the row unit, wherein a controller is connected to the sensor and operatively connected to an adjustment unit in contact with the chain, the adjustment unit comprising an idler in contact with the chain and connected to and movable by an actuator;

moving the gathering chain to a first harvesting position with the adjustment unit with the controller upon sensing the first harvesting condition such that the driven sprocket is at a first position relative to the drive sprocket;

sensing with the sensor a second harvesting condition about the forward end of the row unit; and moving the gathering chain to a second harvesting position with the adjustment unit with the controller upon sensing the second harvesting condition such that the driven sprocket is at a second position relative to the drive sprocket; wherein the adjustment unit laterally adjusts the position of the idler with respect to a centerline of the row unit to move the drive sprocket between the first and second harvesting positions.

\* \* \* \* \*